US009024749B2

(12) United States Patent
Ratajczyk (10) Patent No.: US 9,024,749 B2
(45) Date of Patent: May 5, 2015

(54) TACTILE AND VISUAL ALERT DEVICE TRIGGERED BY RECEIVED WIRELESS SIGNALS (71) Applicant: Chris Ratajczyk, Northbrook, IL (US)

(72) Inventor: Chris Ratajczyk, Northbrook, IL (US)

( * ) Notice: Subject to any disclaimer, the term of this patent is extended or adjusted under 35 U.S.C. 154(b) by 0 days.

(21) Appl. No.: 13/722,905

(22) Filed: Dec. 20, 2012

(65) Prior Publication Data

US 2013/0154826 A1 Jun. 20, 2013

Related U.S. Application Data (60) Provisional application No. 61/577,812, filed on Dec. 20, 2011, provisional application No. 61/678,161, filed on Aug. 1, 2012.

(51) Int. Cl.
*G08B 1/08* (2006.01)
*H04M 19/04* (2006.01)
*G08B 7/06* (2006.01)
*A44C 5/00* (2006.01)
*H04M 1/725* (2006.01)
*G08B 6/00* (2006.01)

(52) U.S. Cl.
CPC ... *G08B 7/06* (2013.01); *G08B 6/00* (2013.01); *H04M 19/047* (2013.01); *A44C 5/0007* (2013.01); *H04M 1/7253* (2013.01)

(58) Field of Classification Search
USPC ............... 340/539.11, 539.1, 539.13–539.19, 340/539.2, 539.21, 539.22–539.23, 539.26, 340/566, 555
See application file for complete search history.

(56) References Cited

U.S. PATENT DOCUMENTS

| | | | |
|---|---|---|---|
| 6,954,659 B2 | 10/2005 | Tushinsky | |
| 7,130,664 B1 * | 10/2006 | Williams | 455/567 |
| 7,642,921 B2 * | 1/2010 | Cutler et al. | 340/573.6 |
| 7,872,575 B2 * | 1/2011 | Tabe | 340/540 |
| 7,945,292 B2 * | 5/2011 | Sweeney et al. | 455/567 |
| 8,624,771 B2 * | 1/2014 | Kuhn | 342/20 |
| 2003/0174049 A1 * | 9/2003 | Beigel et al. | 340/10.42 |
| 2004/0229560 A1 * | 11/2004 | Maloney | 455/3.01 |
| 2007/0017136 A1 * | 1/2007 | Mosher et al. | 40/633 |
| 2007/0132578 A1 * | 6/2007 | Powell | 340/539.26 |
| 2008/0147410 A1 * | 6/2008 | Odinak | 704/270.1 |
| 2010/0268056 A1 * | 10/2010 | Picard et al. | 600/388 |

* cited by examiner

*Primary Examiner* — Daniel Previl (57) ABSTRACT

A wearable signal notification article and a system incorporating the article. The system provides users with a way to stay connected to their wireless devices, even when the user is not in proximity to the device. It comprises a wireless transmitting device, a wireless transmission receiving device, and a wearable signal notification article. When the transmitting device sends a signal to the transmission receiving device, a second signal is sent to the signal notification device to alert the user that a transmission is being received. The wearable signal notification device comprises a flexible, waterproof bracelet housing, and an integrated alert circuit module with a sensor chip, an antenna, at least one light source, a vibrator, and a battery. The device can be worn while swimming, during strenuous activity, or in crowded noisy environments to provide visual and tactile feedback to users about incoming transmissions.

11 Claims, 5 Drawing Sheets

TACTILE AND VISUAL ALERT DEVICE TRIGGERED BY RECEIVED WIRELESS SIGNALS

CROSS REFERENCE TO RELATED APPLICATION

This application claims the benefit of U.S. Provisional Application No. 61/577,812 filed on Dec. 20, 2011, entitled "Blue Band" and U.S. Provisional Application No. 61/678, 161 filed on Aug. 1, 2012 entitled "Blue Band." For the purposes of providing a clear and continuous disclosure the aforementioned applications are incorporated herein by reference.

BACKGROUND OF THE INVENTION

1. Field of the Invention

The present invention relates to a wearable article and related system that alerts the wearer of perceived signals. More specifically, it relates to a flexible, waterproof bracelet containing a signal receiving means, a vibrator, and a light array. When the signal perceiving means detects incoming signals, the article will illuminate and/or vibrate to alert the wearer that an incoming signal is received. The device can be paired with items such as cell phones, radar detectors, tablet computers and any other device that receives incoming transmissions or signals.

Cellular phones, pagers, radar detectors and other signal receiving devices use auditory alerts or vibrations to provide information about incoming messages. It is sometimes inconvenient, or dangerous for users to rely on these auditory alerts. For example, when a person is driving, the loud auditory feedback provided by a radar detector may startle the individual causing them to drive erratically. Alternatively, a person may be in a loud area such as a bar or nightclub, where the ambient noise volume is too high for the user to hear a cell phone ring. When people are at work they are often prohibited from carrying cell phones or pagers on their person and thus do not receive notifications, resulting in the potential for missing important calls. Athletes and people participating in athletic activities suffer from similar problems as it is generally not feasible to carry a phone or pager while working out or playing sports.

The growing size of smart phones and personal assistant devices makes them increasingly cumbersome to carry. Frequently phones or tablet devices are too large to fit in clothing pockets. People are often forced to leave their wireless devices in briefcases, purses, lockers or other storage areas. This effectively separates the user from the device, making it difficult for the user to determine when they have an incoming call, text message, or email. A means for discretely notifying a user of an incoming message is needed. The means must perform in a variety of environments and ambient conditions. Therefore, a signal notification device that is waterproof and flexible enough to fit users of different size is needed.

2. Description of the Prior Art

The present invention is a bracelet with an integrated signal notification system. The invention also includes a system that utilizes the signal notification device to provide users with information about incoming signals. A wireless transmission device such as a cell phone, radar detector, laptop computer, or the like communicates with the bracelet whenever a message, call, or signal is acknowledged. The bracelet then vibrates and illuminates to alert a user about the received signal. The housing portion of the bracelet is made from a flexible waterproof material to allow the device to be worn in water or during strenuous activities that will result in sweating. A number of remote notification devices are now present in the prior art but none of these devices disclose a flexible, waterproof band enclosing the signal receiving and notification means. Thus the prior art devices are entirely unsuitable for use by athletes and swimmers.

Notification systems that incorporate wearable articles are known in the art. These systems use a wireless transmission means such as a cell tower to send a signal transmission to a wireless device. The signal is received by the wireless device, which then sends a signal to the wearable article. Wearable articles will provide visual, audible, or tactile feedback to the user, thus alerting him or her that the intermediate device has received a signal. In U.S. Pat. No. 7,130,664, issued to Williams, a system is disclosed in which a signal transmission means is operatively connected to a device and the device is operatively connected to a wearable article. The transmission means may be a cell tower, and landline call router, or the like. Devices can range from wireless phones, to landline phones, blackberries and laptop computers. Wearable articles may be buttons, pins, watches, earrings, or even dermal patches. None of these devices are waterproof and thus are not suited for use when a user is playing sports, working out at the gym, or swimming. The present invention provides a waterproof, elastic band that protects the signal receiving means inside the wearable article.

A related system is disclosed in Beigel, U.S. Patent Application Publication No. 20030174049. The system includes a wristband containing a processing chip and memory storage, which is in regular communications with an exterior network via Bluetooth or radio frequency signals. Personal identifying information is stored within the device and may be used in conjunction with the exterior network to provide a user with access to restricted areas or increase computer permissions. The wristband of Beigel includes not only a signal receiving means but also a signal transmission means, facilitating the sync of the device with global positioning systems (GPS). The present invention does not store personal identifying information or transmit long range signals, but does otherwise generate short-range transmissions.

Williams and Beigel do not disclose the specific construction of the wearable article, other patents teach the enclosing of a sensing means in a transparent or translucent casing. Tushinsky, U.S. Pat. No. 6,954,659 discloses a bracelet, necklace or watch comprises of transparent or translucent beads. One or more of the beads may enclose a small processing chip, a battery and a led light. When a cellular phone receives a call or message, a signal is sent from the phone and received by the signal processing chip. Receipt of the signal causes the led to illuminate, thereby alerting the user of recent cell phone activity. Though Tushinsky does describe a wearable article with a signaling means, it does not teach a waterproof, elastic article that is suitable for use during sporting events or swimming. As discussed above, the present invention addresses these needs.

Another wearable article containing a signal notification system is disclosed in Sweeney, U.S. Pat. No. 7,945,292. The Sweeney device is a wearable article that contains a remote ringer mechanism. A cellular phone is paired with the device via a Bluetooth connection, placing the two devices in constant communication. When a phone call, text message, or email is received by the cell phone, it transmits a signal to the wearable article. The wearable article emits an audible alert in the form of a ringtone, to alert the user to the incoming call, email, or text message. Audible alerts may be changed via the cell phone so that different types of audible alerts are played to the user depending on the type of data received by the phone. This device does not provide visual or tactile feedback and is not described as waterproof or suitable for activities involving water. The present invention is a wireless notification device that provides multiple feedback means to users engaged in activities and/or water sports.

These prior art devices have several known drawbacks. They do not teach a device that is durable, flexible, and waterproof; features that are essential to athletes and casual swimmers alike. The present invention provides a flexible waterproof bracelet that contains a signal receiving means, a battery, and a means for generating both visual and tactile feedback to users. Swimmers, sweaty athletes, and even people venturing out into the rain can use the device to remain informed about incoming transmissions without exposing their wireless devices to moisture in the surrounding environment. The device substantially diverges in design elements from the prior art and consequently it is clear that there is a need in the art for an improvement to existing wearable signal notification devices. In this regard the instant invention substantially fulfills these needs.

SUMMARY OF THE INVENTION

In view of the foregoing disadvantages inherent in the known types of wearable signal notification devices now present in the prior art, the present invention provides a new athletics-friendly waterproof housing wherein the same can be utilized for providing convenience for the user when [participating in physical activities or swimming in water.

The wearable article of the present invention is a bracelet formed from a waterproof, elastic housing. Inside the housing a vibrator and one or more light sources are integrated into an alert circuit module with, a battery, and a sensor chip. An antenna is connected to the sensor chip and may be an onboard antenna or may extend from the chip. This antenna receives short range signals such as Bluetooth or radio band. The sensor chip contains embedded logic configured to detect wireless signals within a predetermined frequency range and strength. Upon detection of an incoming wireless signal, the sensor chip's embedded logic activates the alert circuit module, illuminating the light sources and causing the vibrator to vibrate the housing. In this way the bracelet provides both visual and tactile feedback to a user whenever a signal of predetermined type is received.

Inaudible alerts to incoming messages and signals can be advantageous to a user in many situations. For this reason, the present invention also provides a system involving the signal notification bracelet. The system includes a wireless signal transmission means, a portable device capable of sending and receiving multiple types of wireless signals, and the wearable article described above. Examples of contemplated systems include cell towers, cell phones and the bracelet; a radar gun, radar detection device, and the bracelet; a wireless router, a tablet pc, and the bracelet. The varied nature of these examples illustrates the variety of ways in which the present invention can be implemented.

In all parts of the invention the wearable article is a single band made of a waterproof, elastic material. Though the precise material, shape, and size can vary to suit the aesthetic desires of consumers, it is important that the band is durable and can accommodate differently sized users. Unlike other wearable notification devices, the present invention is designed for use by athletes, swimmers, and people in crowded or dangerous environments. The bracelet's waterproof, durable, and flexible qualities make it ideal for people who participate in physical activities where they do not have access to their mobile device.

It is therefore an object of the present invention to provide a new and improved wearable signal notification device and system that has all of the advantages of the prior art and none of the disadvantages.

It is therefore an object of the present invention to provide an inaudible signal notification means for people in environments where audible feedback is inappropriate or infeasible.

Another object of the present invention is to provide a wearable signal notification device that is waterproof, durable, and elastic and is thus suitable for use in strenuous physical activities.

Yet another object of the present invention is to alert users that a signal is being received by a mobile device without the need for the user to be in contact with the mobile device.

Still another object of the present invention is to incorporate an inaudible wireless notification device into a system for receiving notification of incoming signals.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 shows a side view of the signal notification bracelet device. The bracelet housing is constructed from an elastic, waterproof material that permits stretching and deformation of the housing. In this embodiment there is a small connection port in the side of the bracelet to permit connection of an exterior power source. This embodiment provides users with the ability to recharge the internal battery and thereby extend the useful life of the device.

FIG. 6 shows a perspective view of the signal notification bracelet in use by a swimmer. The device vibrates and illuminates despite exposure to the watery environment. Thus, the user is notified of an incoming signal even though he is nowhere near his mobile wireless device.

DETAILED DESCRIPTION OF THE INVENTION

Reference is made herein to the attached drawings. Like reference numerals are used throughout the drawings to depict like or similar elements of the wearable signal notification device. For the purposes of presenting a brief and clear description of the present invention, the preferred embodiment will be discussed as used for alerting a user to incoming signal communications when the user is not in proximity to the receiving device. The figures are intended for representative purposes only and should not be considered to be limiting in any respect.

Figure 1:
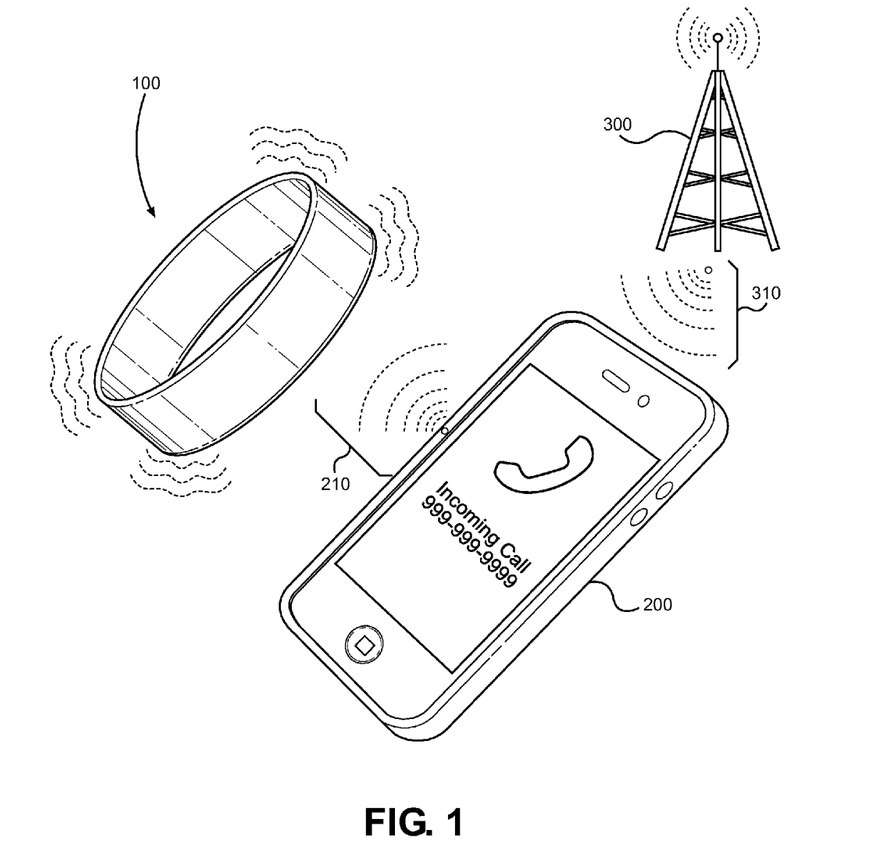
FIG. 1 shows a general diagram of an exemplary embodiment of the system. In the diagram a cell tower transmits data to a cellular phone, which then sends a signal to the signal notification bracelet.

Referring now to FIG. 1, there is shown an exemplary embodiment of the signal notification system of the present invention. The system includes a wireless signal transmission means 300, a wireless signal receiving device 200, and a wearable signal notification device 100. In the depicted example, the wireless signal transmission means is a cellular or PCS tower that transmits data via a first transmission signal 310, to the wireless signal receiving device. The first transmission signal is a radio frequency signal falling within the analog band or one of the digital cellular bands. It should be understood that signals are not limited to incoming call or data frequencies, but may also include carrier control frequencies. Inclusion of carrier control signal frequencies provides the system with the ability to notify users when they are roaming, or when they enter a "dead zone" where neither analog nor digital service is available.

The wireless transmission receiving device 200 contains at least an internal antenna operatively connected to a sensor chip that perceives and processes incoming signals, a display, and a battery. A Smartphone is depicted in the exemplary embodiment to illustrate the types of wireless transmission receiving devices that may be used with the system of the present invention. When the antenna receives an incoming wireless signal, the device will display a notification to the user. It is preferred that the displayed notification will vary depending on factors such as the strength of the incoming signal, the type of incoming signal, or the type of data received. In FIG. 1, this visual notification is illustrated as an incoming call message that appears on the Smartphone display. Some embodiments of the system will include wireless transmission receiving devices that include speakers that output an auditory notification along with the displayed alert. While these notifications are helpful to users in proximity of the device, the notifications will not reach users who are not within hearing range of the device.

To ensure that users are alerted to incoming signals, when they are not able to see or hear notifications from the wireless transmission receiving device 200, the present system provides a signal notification bracelet 100. When the wireless transmission receiving device detects an incoming signal transmission the device sends a second transmission signal 210 to the signal notification bracelet. Due to limited battery capacity, most mobile wireless devices have small transmitters and are therefore not able to send long-range signals. Short-range radio frequency signals, such as those employed by the Bluetooth protocol are ideal second transmission signals. Bluetooth transmissions are well suited for situations where the user is not near their phone but plans on being within the 30-35 ft range of Bluetooth signals. Athletes such as runners and swimmers are likely to range farther than 35 ft from their phone, making it necessary for the system to include a secondary transmission signal option that has a more expansive range. Upon receiving an incoming signal, the wireless transmission receiving device may attempt to initiate a Bluetooth connection with the signal notification device. If the user is not within range, the connection attempt will fail and the transmission receiving device will switch to a different radio frequency protocol with a bigger range. This signal switching will assist the transmission receiving device in preserving battery life by defaulting to the less costly Bluetooth protocol prior to attempting connection protocols that expend more energy.

The signal notification bracelet 100 is a wearable article that contains a vibrator, at least one light source, a sensor chip, and a battery. A band formed from a waterproof, elastic material houses the circuitry components. When the sensor chip perceives an incoming signal from the wireless transmission receiving device, an integrated alert circuit instructs the light to illuminate and the vibrator to vibrate. The bracelet thus provides both visual and tactile feedback to the user, wherein the wireless transmission receiving device perceives an incoming signal The specific construction and use of the signal notification bracelet will be described in greater detail herein, but it should be understood that the bracelet must be durable, elastic, and waterproof to permit use during strenuous physical activities.

The system as illustrated in FIG. 1 includes a cellular or PCS tower, a Smartphone, and the signal notification bracelet. This is merely an exemplary implementation and is in no way intended to limit the system to phone systems. An alternative implementation of the system involves the use of a police radar gun as the wireless transmission means, a radar detection device as the wireless transmission receiving device, and the notification bracelet. In this embodiment, the radar gun sends out radar waves and measures the time differential between sent and received radar signals to measure how fast a car is going. A radar detection device located in a car driving through the radar waves will detect the radar signal and send a radio frequency signal to the signal notification bracelet. This allows the user to turn off the radar detector's auditory notifications, and still receive notice of detected radar waves via the signal notification bracelet.

Another implementation of the system utilizes a radio communications tower, a dispatch receiving unit, and the signal notification bracelet. The dispatch receiving unit may be installed in a police vehicle, taxi cab or the like. Dispatches and important information about perpetrators or client pickups is sent via the radio communications tower to the dispatch receiving unit. The unit then sends a short-range signal to the signal notification bracelet. In this manner, police or taxi drivers can be noted of incoming communications when away from their vehicle. Police will be able to grab a cup of coffee without fear of missing important information. Similarly, taxi cab drivers will be able to eat dinner or socialize with other drivers at a taxi stand without worrying that they will miss out on a potential client. Unlike prior art devices, the signal notification device is durable enough for use while chasing down perpetrators on foot or while washing a taxi cab.

The varied implementations of the present system make it a substantial improvement over previously known signal notification systems. It provides a low cost solution that can be used by people of all shapes and sizes. The bracelet can be worn during strenuous activities, in high or low temperature environments, or in the water. The system is versatile and will be useful in situations aside from those described herein.

Figure 2:
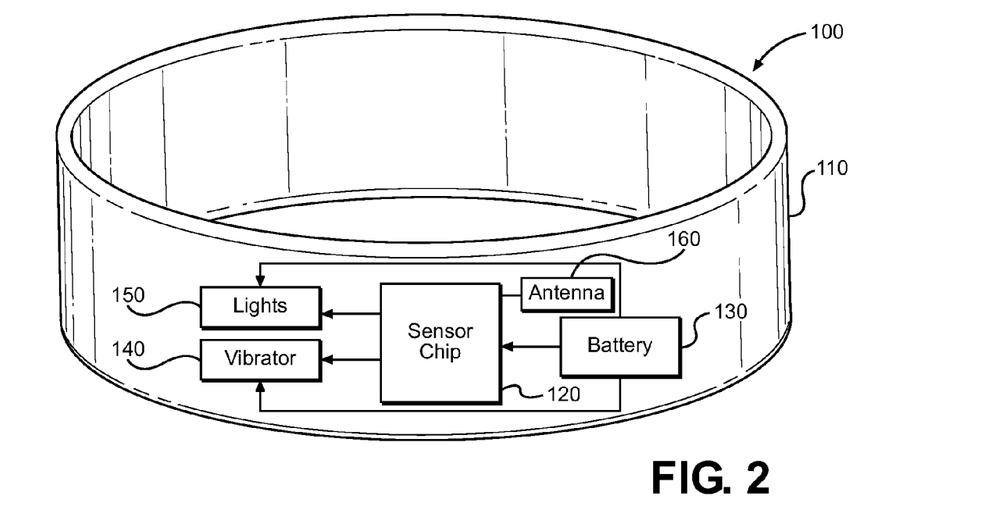
FIG. 2 shows a system diagram of the bracelet's integrated alert circuit with at least one light source, a vibrator, a sensor chip, an antenna, and a battery.

Referring now to FIG. 2, there is shown a general system diagram of the wearable signal notification device. The device 100 has a bracelet housing 110 containing an integrated alert circuit module. The circuit module comprises a sensor chip 120, an antenna 160, a battery 130, at least one light source 150, and a vibrator 140. Integrated alert circuit modules are known in the art of electrical engineering and the general construction of the present circuit module will be readily apparent to one of ordinary skill. Similarly, sensor chips are well known in the art and any such chip may be used so long as it has at least one input terminal and two output terminals. The antenna is operatively connected to the sensor chip input and the light source(s) and vibrator are operatively connected to the sensor chip outputs.

The antenna 150 will vary slightly in length according to the desired range of the device, and the type of wireless signal employed. In one embodiment a small antenna and the sensor chip 120 may be integrated into the surface of a small circuit board. In another embodiment the antenna may be one or more conductive wires with a length substantially greater than that of the sensor ship. The wire(s) will be operatively connected to the sensor chip and may extend in parallel along the length of the bracelet housing 110. Flexibility and elasticity of the bracelet housing is an important feature of the present invention, thus the antenna should not extend for more than half of the length of the housing. Depending on the embodiment of the invention, the antenna may range in length from a few millimeters to a few inches, so long as the length of the antenna does not impede the flexibility of the housing.

When the antenna detects an incoming signal, the signal is sent to the sensor chip via the input terminal. The sensor chip then activates the light source(s) 150 and vibrator 140 via the output terminals. In a preferred embodiment the light source is one or more high intensity light emitting diodes (LEDs). High intensity LEDs provide a highly visible point light source that requires a small amount of energy. They are well suited to use in the present invention because they will not drain the battery significantly during regular use. A variety of LED colors are available, and the specific color combinations and arrangement thereof may be determined during manufacturing. To increase visibility of the LEDs, part or all of the bracelet housing should be opaque or semi-translucent. A combination of solid and translucent material may be used in order to create aesthetically pleasing patterns along the surface of the bracelet. For example, the entire bracelet may be blue, with the majority of the band being solid, and a portion associated with the word "ALERT" may be translucent, so that activation of the LEDs results in illumination of the word "ALERT."

In addition to the lights, a small vibration mechanism 140 is included. Shaftless vibration motors are preferred due to the thinness of the bracelet housing. Vibration motors such as coin and pancake motors are well suited for use in the signal notification device. When the sensor chip activates the vibrator motor, the entire device will begin to vibrate. Vibrations may come in pulses, or in a steady vibration patter. Vibration patterns may be programmed to correspond with specific types of notices. By way of example, a detected radar signal of weak strength may cause the bracelet to pulse, while the detection of a strong radar signal may cause the device to vibrate continuously. Instructions of this nature are contained in the sensor chip's embedded logic. The vibration mechanism may include its own circuitry, independent of the rest of the integrated alert circuit module except for the connection to the sensor chip output terminal. Alternatively, the integrated alert circuit module may be designed such that the sensor chip is integrated into the vibration motor circuitry. The precise implementation of the circuit module will depend on the size of the bracelet housing and various economic factors. Thus, it is left to one of ordinary skill to determine the most appropriate configuration of the elements of the integrated alert circuit module.

Small batteries with a long life are present in the art. Cadmium, lithium, and lithium ion batteries are commonly used to power consumer electronics and small devices. The battery 130 of the present invention is electrically connected to the light source(s) 150, the vibrator 140, and the sensor chip 120. Any battery suitable for powering these elements may be used in the present invention.

The entire integrated alert circuit module is contained within a bracelet housing 110. The housing is a band style bracelet constructed from a waterproof, elastic material. Materials such as silicone and rubber are recommended because they are not only waterproof and elastic, but are also highly durable and are thermal insulators. The overall thickness of the bracelet housing will depend on the size of the elements of the integrated alert circuit module, but it should be understood that the bracelet should be thin and lightweight. Bulky or heavy accessories are not desirable during physical activities, making a light weight, low-profile structure an important aspect of the present invention.

Figure 3:
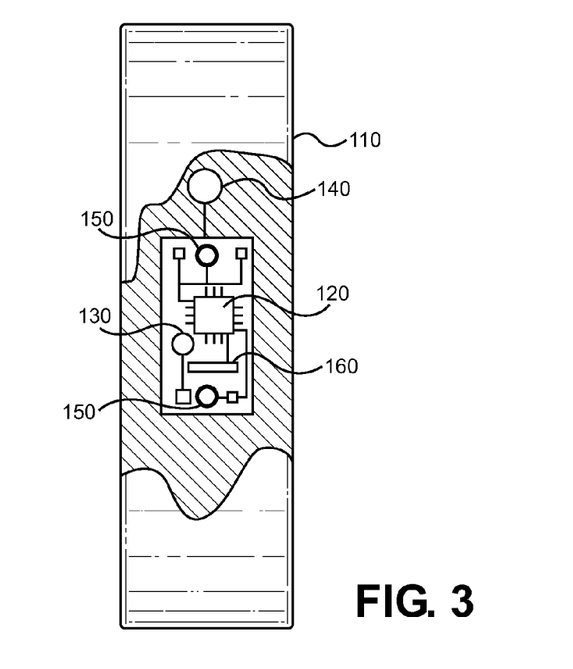
FIG. 3 shows a cross-sectional view of the signal notification bracelet device. In this embodiment the device has two light sources secured to a circuit board and operatively connected to illuminate at the same time.
Figure 4:
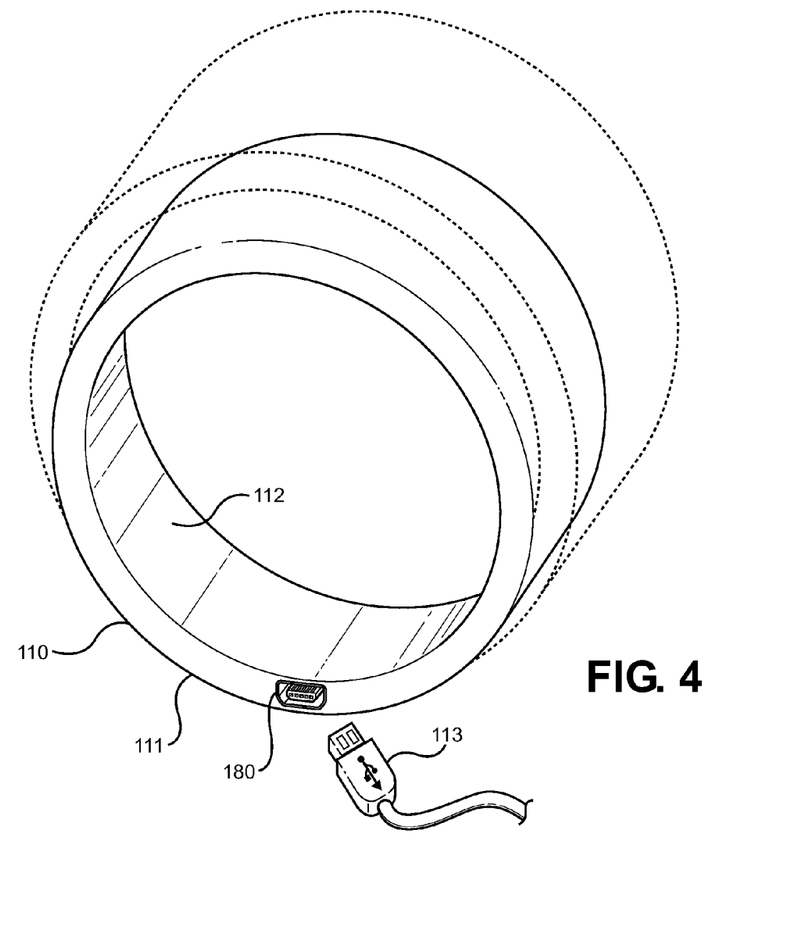

Turning now to FIG. 3, there is shown a cross-sectional view of the front of the signal notification bracelet. The outer surface of the bracelet housing 110 is cut-away to reveal the elements of the integrated circuit module. A sensor chip 120, antenna 160, battery 130, and two high intensity LEDs 150 are secured to a circuit board 170. A vibrating mechanism 140 extends off to one side of the board. These elements are enclosed in the bracelet housing which is molded around them, either with or without an internal cavity. In the figure, the bracelet housing is shown without an internal cavity, meaning that the silicone or rubber material is molded directly around the component parts. This restricts movement of the parts, making it less likely that they will be damaged due to jostling. Athletes often collide with objects during strenuous activity. For this reason, the present invention provides a durable and impact resistant bracelet housing to protect the internal components from collision damage. Both embodiments benefit from the material construction of the device because the silicone or rubber material, or silicone and rubber blends, will be deformable and impact resistant Another view of the bracelet housing is shown in FIG. 4. The bracelet housing 110 is shown from the side, with both the outer surface 111 and inner surface 112 viewable. The housing is flexible and elastic to permit the band to stretch. Users of different sizes can be accommodated by a single device because the band's diameter can be stretched to receive larger hands. Flexibility and elasticity also prevent the band from breaking if it becomes snagged on clothing or other objects while in use.

In one embodiment, the device has a small external port 180 disposed along a side or the outer surface of the bracelet housing 110. This port is operatively connected to the internal battery. External power sources are connected to the device via the external port to facilitate battery recharging. A small plug may be attached to and loosely extending from the bracelet housing near the external port. The plug is preferably made of the same material as the bracelet housing and is sized to fit within the external port to seal it when it is not in use. Though the plug is useful in preventing dirt and debris from getting into the external port it is an optional feature. The plug may be left off of some devices and the port left exposed. In all embodiments the device and its internal components will have waterproofed coating to ensure that submerging the device in water does not allow interior components to experience water damage. Depicted in FIG. 4, is an external port in the form of a mini-universal serial bus (USB) port with an accompanying mini-USB cord 113. This is for exemplary purposes only as any power transfer connection known in the art of small electronics may be employed.

Figure 5:
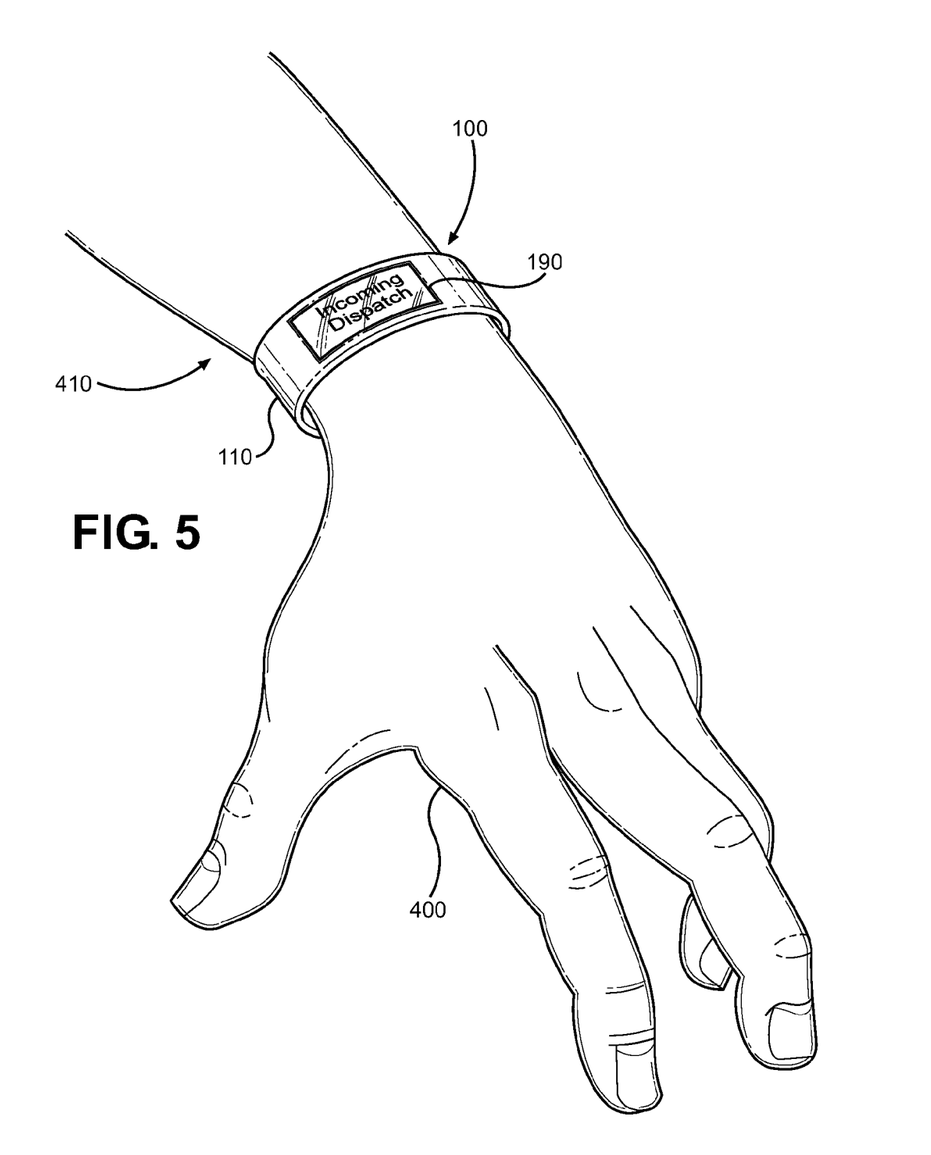
FIG. 5 shows a perspective view of an alternative embodiment of the signal notification bracelet device. A small display screen is embedded in the bracelet housing for displaying information about incoming signals. This embodiment not only alerts a user to incoming signals, but provides information about received signals so that a user may determine whether he or she needs to examine the associated wireless device.

An alternative embodiment of the device is shown in FIG. 5 as a signal notification bracelet 100 with a display means 190. The display means may be a small LED display or LCD display set into the outer surface of the bracelet housing 110, It is preferable that the display sits flushly with or is slightly recessed from the housing outer surface so as to protect the screen from damage. Screens for small electronics are well known in the art and it will be apparent to one of ordinary skill that the display will be connected to an output terminal of the sensor chip. The display may replace the light source(s) or may be present in addition to the light source(s). Messages displayed on the screen may vary according to the nature of the signal received by the wireless transmission receiving device. By way of example, the signal notification bracelet shown in FIG. 5 displays the message "incoming dispatch." The bracelet is worn on the wrist 410 of a user, but may be stretched to fit over the hand 420.

Figure 6:
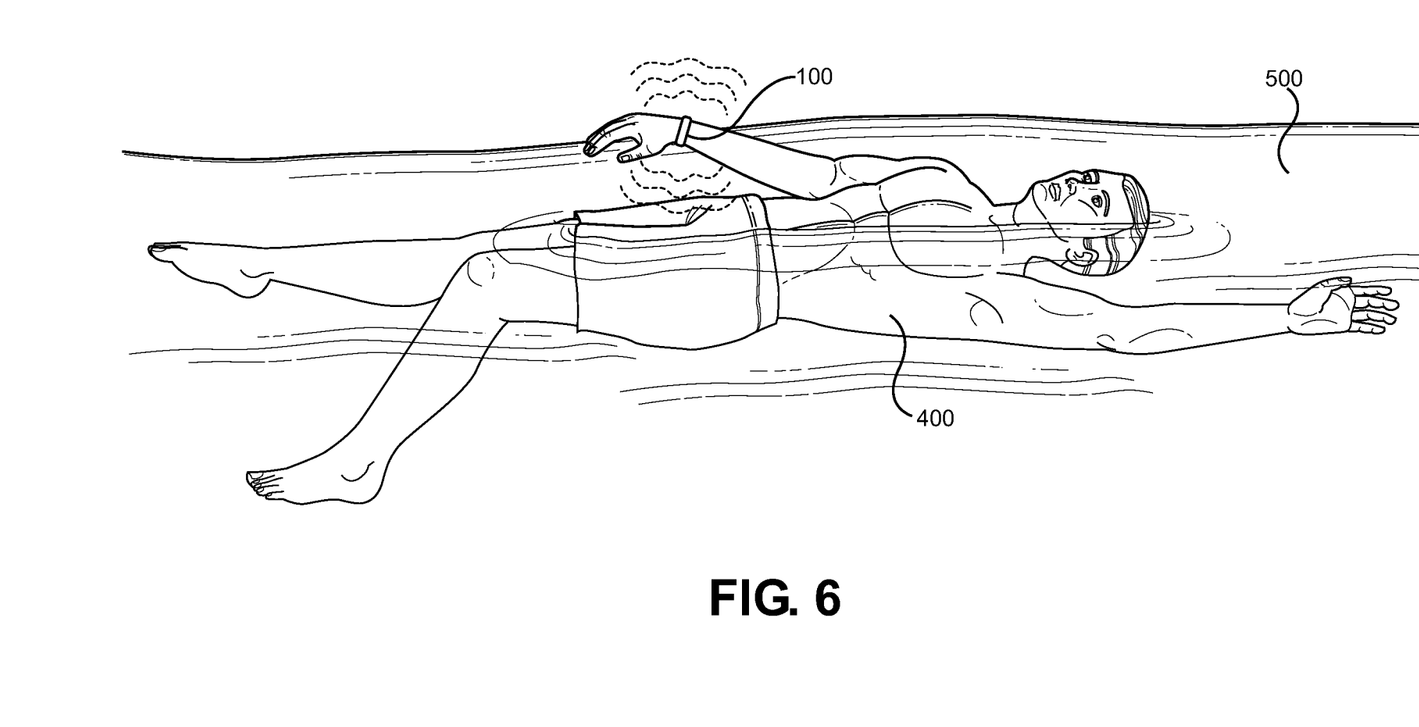

Turning now to FIG. 6, there is shown a user swimming while wearing the signal notification bracelet. A swimmer 400 is partially submerged in water 500 and is performing the backstroke. The signal notification bracelet 100 is worn on the user's arm and consequently is submerged every time the user rotates his arm through the water. Despite the submersion and the constant movement of the device, it is still able to operate properly. The device is vibrating to provide the user with tactile feedback that a signal is being received by a remote wireless transmission notification device, such as the swimmer's cell phone.

In use an individual chooses the embodiment of the signal notification device that best suits her needs. She then "pairs" the notification bracelet with a Bluetooth compatible wireless transmission receiving device. If the transmission receiving device is not Bluetooth compatible then no pairing is needed. Next, the user places the signal notification bracelet around her wrist by slipping it over her hand, stretching as necessary. She can then leave her wireless transmission device in a locker, on a sideline bench, or any other area she deems safe to leave the device. When an incoming signal such as an email, text message, or phone call is received, the transmission receiving device will transmit a short-range signal. The signal notification device detects the signal and begins to vibrate and illuminate. The user can then check the wireless transmission receiving device or ignore the alerts. Vibration and illumination functions will cease after a pre-set period of time. If the selected embodiment of the signal notification device has a rechargeable battery, then the user will connect the device to a computer or a wall outlet after she is done using the bracelet.

The present invention is both a wearable signal notification device and a versatile signal notification system that incorporates the device. The invention as a whole provides users with a way to stay connected to their wireless devices when the device is not nearby. Users may don the device to receive visual and tactile feedback whenever an associated wireless transmission receiving device receives a wireless transmission. Visual feedback may come from h individual light sources or may be in the form of a small display. Tactile feedback is generated by a vibrating motor that vibrates the device when incoming transmission is received. The wearable article is a band style bracelet that may come in many colors and sizes but should be constructed of a durable waterproof material. In this way, the device is well suited for use by athletes and participants in physical activities.

The system of the present invention includes the wearable signal notification article, a wireless signal transmission receiver, and a wireless signal transmitter. As discussed above, the wireless signal transmitter may be a radar gun, a wireless router, a cellular or PCS tower, a radio tower, or any other device capable of transmitting a signal that is perceived by a secondary device. Similarly, the wireless signal transmission receiving device may be a radar detector, a notebook computer, a tablet computer, a cell phone, an onboard dispatch receiving unit, or any other device capable of sending and receiving wireless transmissions. Thus, the system provides users with many options for receiving notice of incoming transmissions. It will be useful to athletes, partygoers, police, cab drivers, doctors, nurses, and many others. It is a substantial improvement over the prior art due to its versatility, and range of coverage.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wireless signal notification system, comprising:
   a wireless signal transmission means;
   a wireless transmission receiving device that is capable of sending and receiving wireless signals and that sends a wireless signal to a wireless signal notification bracelet when said wireless transmission receiving device receives a wireless signal from said wireless signal transmission means;
   a wireless signal notification bracelet that receives wireless signals from said wireless transmission receiving device, and wherein said wireless signal notification bracelet comprises a waterproof, elastic housing that houses
   a sensor chip, an antenna, a battery, a visual feedback means, and a vibration mechanism,
   wherein said sensor chip activates said visual feedback means and said vibration mechanism upon detection of a wireless signal from said wireless transmission receiving device by said antenna.

2. The system of claim 1, wherein said visual feedback means is one or more high intensity light emitting diodes.

3. The system of claim 1, wherein said visual feedback means is a digital display.

4. The system of claim 1, wherein said wireless signal transmission means is a radar gun, and wherein said wireless transmission receiving device is a radar detector.

5. The system of claim 1, wherein said wireless signal transmission means is a radio tower, and wherein said wireless transmission receiving device is an onboard dispatch unit installed in an automobile.

6. The system of claim 1, wherein said wireless signal transmission means is a cellular tower.

7. The system of claim 1, wherein said wireless signal transmission means is a wireless router.

8. The system of claim 1, further comprising an external port operatively connected to said battery.

9. The system of claim 1, wherein said housing is made of silicone.

10. The system of claim 1, wherein said housing is made of rubber.

11. The system of claim 1, wherein said wireless signal transmission means comprises a cellular tower, and wherein said wireless transmission receiving device comprises a Smartphone.

* * * * *